*(12)* United States Patent
Krten et al.

(10) Patent No.: US 9,454,666 B2
(45) Date of Patent: Sep. 27, 2016

(54) METHOD FOR PROTECTING DATA

(75) Inventors: Robert Krten, Ottawa (CA); Hongrui Dong, Ottawa (CA); Clifford Liem, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 14/388,232

(22) PCT Filed: Mar. 26, 2012

(86) PCT No.: PCT/CA2012/000269
§ 371 (c)(1),
(2), (4) Date: Sep. 25, 2014

(87) PCT Pub. No.: WO2013/142943
PCT Pub. Date: Oct. 3, 2013

(65) Prior Publication Data
US 2015/0324590 A1 Nov. 12, 2015

(51) Int. Cl.
*G06F 21/00* (2013.01)
*G06F 21/60* (2013.01)
*G06F 17/30* (2006.01)
*G06F 21/14* (2013.01)
(Continued)

(52) U.S. Cl.
CPC ......... *G06F 21/60* (2013.01); *G06F 17/30097* (2013.01); *G06F 21/125* (2013.01); *G06F 21/14* (2013.01); *G06F 21/64* (2013.01); *H04L 9/0894* (2013.01); *H04L 9/3239* (2013.01); *G06F 2221/2107* (2013.01); *H04L 2209/16* (2013.01)

(58) Field of Classification Search
CPC ...................................... G06F 21/14
See application file for complete search history.

(56) References Cited

U.S. PATENT DOCUMENTS 5,764,766 A * 6/1998 Spratte .................. H04L 9/0838
380/262
8,270,963 B1 * 9/2012 Hart .......................... G06F 8/65
455/418

(Continued)

FOREIGN PATENT DOCUMENTS

EP 2264639 A2 12/2010

OTHER PUBLICATIONS

Chen, Y. et al., "Oblivious Hashing: A Stealthy Software Integrity Verification Primitive", Proceedings of the 5th International Workshop on Information Hiding, Noordwijkerhout, The Netherlands, Oct. 7-9, 2002, 16 pages, Oct. 7, 2002 (Jul. 10, 2002).

(Continued)

*Primary Examiner* — Morshed Mehedi
(74) *Attorney, Agent, or Firm* — Marc S. Kaufman; Amardeep S. Grewal; Reed Smith LLP

(57) ABSTRACT

In the present disclosure, a hash function is computed over a known image, for example, an address range in a program. The result of the hash function is known to be the same at two distinct points in time, before the program is run, i.e. signing at build-time, and during the running of the program, i.e. run time. The value that the programmer wishes to hide, i.e. the secret value, is also known at build-time. At build-time, the secret value is combined with the hash in such a way that the combining operation can be reversed at run time. This combined value, i.e. the salt, is stored along with the program. Later, at runtime, the program computes the same hash value as was computed at signing time, and does the reverse combining operation in order to reveal the secret value.

33 Claims, 11 Drawing Sheets

(51) Int. Cl.
*G06F 21/64* (2013.01)
*G06F 21/12* (2013.01)
*H04L 9/08* (2006.01)
*H04L 9/32* (2006.01)

(56) References Cited

U.S. PATENT DOCUMENTS

| | | | |
|---|---|---|---|
| 2003/0123701 A1 | 7/2003 | Dorrell et al. | |
| 2006/0253714 A1* | 11/2006 | Ito | G06F 21/554 713/194 |
| 2007/0198838 A1* | 8/2007 | Nonaka | G06F 21/10 713/176 |
| 2008/0168564 A1* | 7/2008 | Lerouge | G06F 21/64 726/26 |
| 2008/0235772 A1* | 9/2008 | Janzen | G06F 21/31 726/5 |
| 2008/0256631 A1* | 10/2008 | Zvi | G06F 21/56 726/22 |
| 2008/0263366 A1 | 10/2008 | Mauruthi | |
| 2009/0077104 A1 | 3/2009 | Sheets | |
| 2009/0265558 A1* | 10/2009 | Izu | H04L 9/3236 713/176 |
| 2010/0037068 A1* | 2/2010 | Murase | G06F 21/6209 713/193 |
| 2011/0154063 A1* | 6/2011 | Tani | G06F 21/602 713/193 |
| 2014/0304197 A1* | 10/2014 | Jaiswal | G06F 21/6209 706/12 |

OTHER PUBLICATIONS

Fiskiran, A.M. et al., "Runtime Execution Monitoring (REM) to Detect and Prevent Malicious Code Execution", Proceedings of the 22nd IEEE International Conference on Computer Design, ICCD'04, Oct. 11-13, 2004, San Jose, CA, USA, 6 pages, Oct. 11, 2004.

Horne, B. et al., "Dynamic Self-Checking Techinques for Improved Tamper Resistance", Proceedings of the First ACM Workshop on Digital Rights Management, DRM 2001, Philadelphia, PA, USA, pp. 141-159, Nov. 5, 2001 (May 11, 2001).

van Oorschot, P.C., "Revisiting Software Protection", Proceedings of the 6th International Conference on Information Security, ISC 2003, Bristol, UK, Oct. 1-3, 2003, 13 pages, Oct. 1, 2003 (Jan. 10, 2003).

International Search Report and Written Opinion cited in corresponding International Application No. PCT/CA2012/000269 dated Nov. 29, 2012.

Extended European Search Report cited in corresponding European Application No. 12873324.3 dated Aug. 12, 2015.

Ping Wang: Tamper Resistance for Software Protection, Dec. 24, 2004, Daejeon, Korea.

* cited by examiner

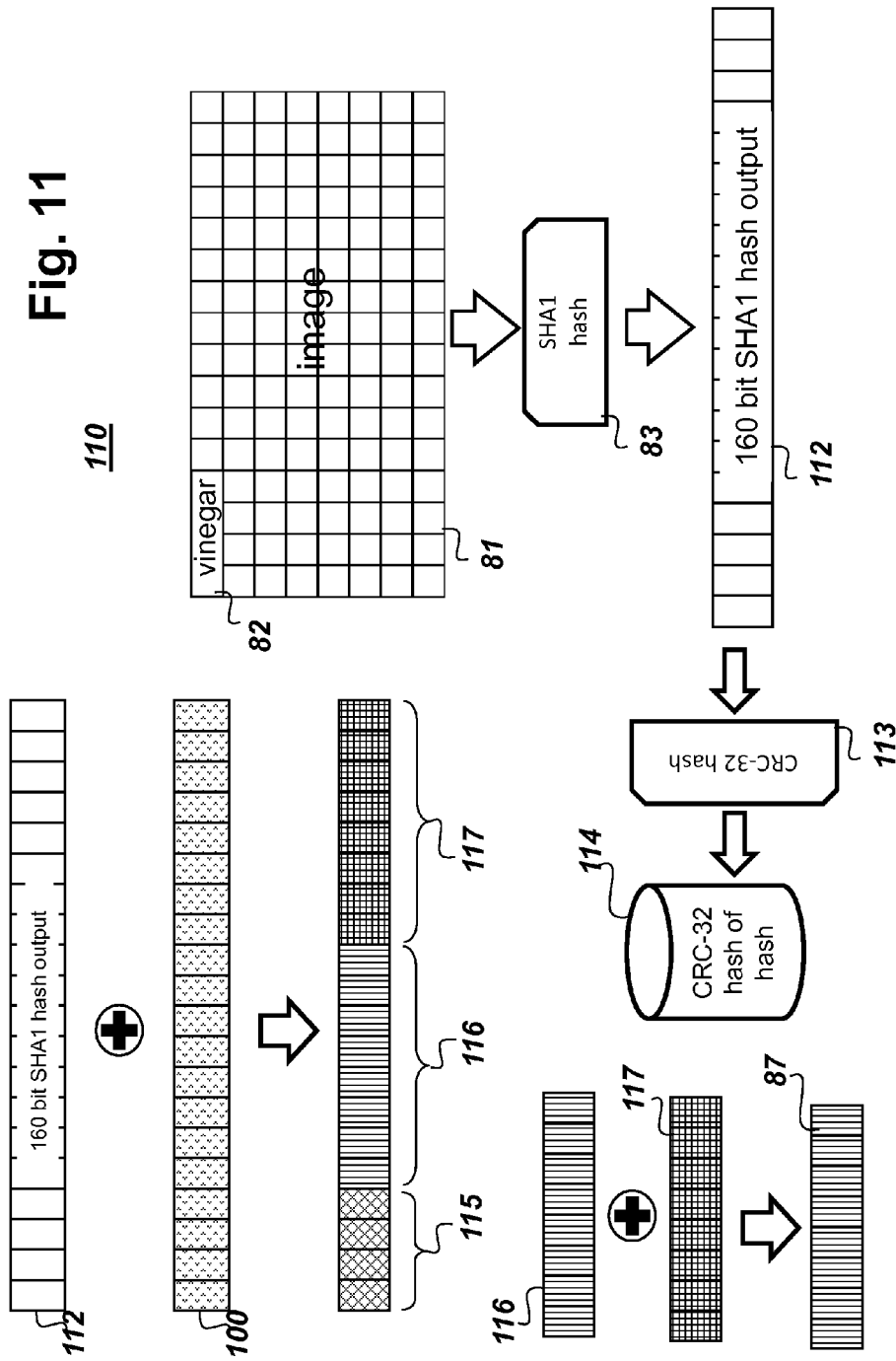

METHOD FOR PROTECTING DATA

RELATED APPLICATION DATA

This application is the National Stage of International Patent Application No. PCT/CA2012/000269, filed Mar. 26, 2012, the disclosure of which is hereby incorporated by reference in its entirety.

FIELD OF THE INVENTION

The present invention relates to methods for protecting data and is particularly concerned with providing protection to sensitive data.

BACKGROUND OF THE INVENTION

A sensitive program, that is, one that is subject to attack/tampering, has certain data that's used during its operation that's considered sensitive. For example, after completion of a set of calculations within the software, a subroutine, out of a large set of subroutines in the program, needs to be activated. However, revealing which subroutine is to be activated may aid the attacker in subverting the operation of the software. In this case, the address of the subroutine is a valuable asset that needs to be protected. In another example, a video stream may need to be decrypted with a key. The key, therefore, constitutes a valuable asset that needs to be protected.

Existing software implementations lend themselves to varying degrees of static analysis. That is, once the attacker is able to extract the entire software load, they are able to prioritize and reverse engineer targeted components based on the functionality they wish to exploit. Because all of the important data variables are static, the attacker can simply read them from the reverse engineered code. Secrets that are embedded directly in the program like a function address and/or a decryption key are easily retrieved by an attacker.

The basic solution to this problem is to hide the sensitive data. A well-known way of doing this is via a "split secret" model, whereby the data is decomposed into two parts, each of which is useless on its own, but when combined, restore the original data.

Systems and methods disclosed herein provide method and system of hashing data for providing protection to sensitive data to obviate or mitigate at least some of the aforementioned disadvantages.

SUMMARY OF THE INVENTION

An object of the present invention is to provide improved methods of protecting sensitive data.

Accordingly, in the present disclosure, a hash function is computed over a known image (for example, an address range in a program). The result of the hash function is known to be the same at two distinct points in time—before the program is run (i.e. signing at build-time), and during the running of the program (i.e. run time). The value that the programmer wishes to hide (i.e. the secret value) is also known at build-time. Still at build-time, the secret value is combined with the hash in such a way that the combining operation can be reversed at run time. This combined value (i.e. the salt) is stored along with the program. Note that the salt in no way statically reveals the secret value. Later, at runtime, the program computes the same hash value as was computed at signing time, and does the reverse combining operation in order to reveal the secret value. A further refinement shows how to verify that the sensitive value is correct without doing a direct comparison against the sensitive value (which would undesirably reveal the expected "correct" value).

In accordance with an aspect of the present invention there is provided a method of protecting sensitive data comprising the steps of during build time, hashing an image to produce a first hash, combining sensitive data with the first hash to form a salt, storing the salt and at runtime, hashing the image to produce a second hash, retrieving the salt, combining the second hash and the salt to recover the sensitive data.

BRIEF DESCRIPTION OF THE DRAWINGS

The present invention will be further understood from the following detailed description with reference to the drawings in which:

FIG. 11 illustrates a method of recovering the sensitive data protected by the method of FIGS. 8 to 10.

DETAILED DESCRIPTION OF THE PREFERRED EMBODIMENT

TABLE A

| | Definitions |
|---|---|
| Hash Function | A one-way cryptographic function applied to an image. The function has two important characteristics: It is computationally infeasible to create another image that has the same hash; and it is impossible to reverse the function (that is, produce the image based solely on the hash value). Examples of a suitable hash function include SHA1 which take as input an arbitrary sequence of bytes and produces a 160-bit output hash value. This invention is not dependent on the particular hash function in use. Other hash functions include SHA2, MD5, etc. |
| Image | The source data used as input to a hash function, for example the .text section of the program. |
| Salt | An arbitrary value that, when combined with a hash value, produces an expected, meaningful result (e.g. a function address). |
| Vinegar | A sequence of bytes combined with the image, which will effectively cause a modified hash value. |

Figure 1:
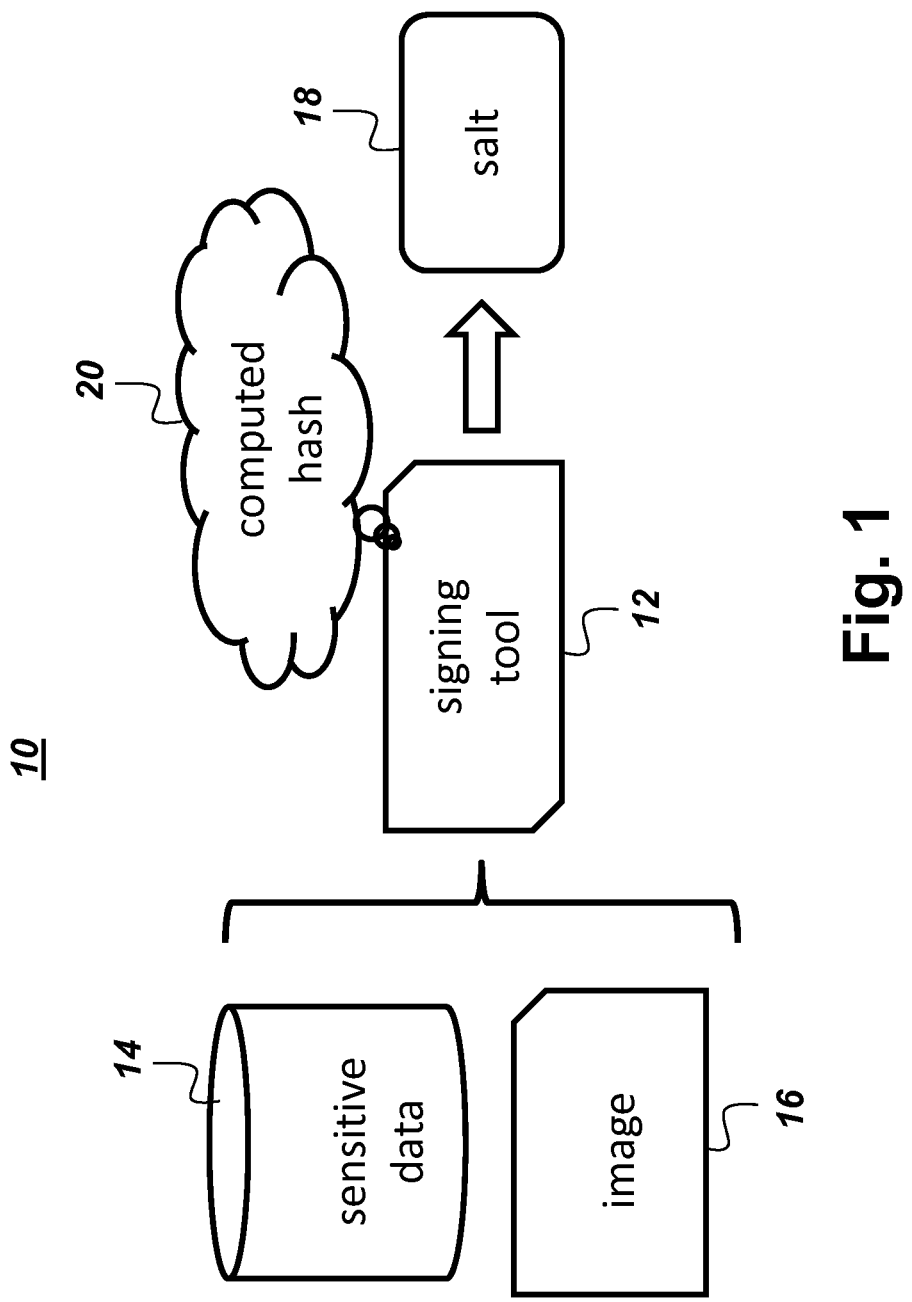
FIG. 1 illustrates a method of protecting sensitive data in accordance with a first embodiment of the disclosure.

Referring to FIG. 1 there is illustrated a method of protecting sensitive data in accordance with a first embodiment of the disclosure. In order to implement the technology, the system 10 includes a signing tool 12 (i.e. a build-time program), a sensitive piece of data 14 requiring protection (i.e. the secret data), an image 16, an optional vinegar (not shown in FIG. 1), a place to store a salt 18 and a target program (not shown in FIG. 1).

In operation, the signing tool 12 is given as input a sensitive piece of data 14 to hide, and an image 16 used to compute a hash 20 over an image. The image 16 can be arbitrarily sized and can be a selected portion of a larger data set. The signing tool 12 then computes a salt 18 based upon the sensitive data 14, the image 16, and the computed hash 20.

The salt 18 is then stored for later use by the target program.

Figure 2:
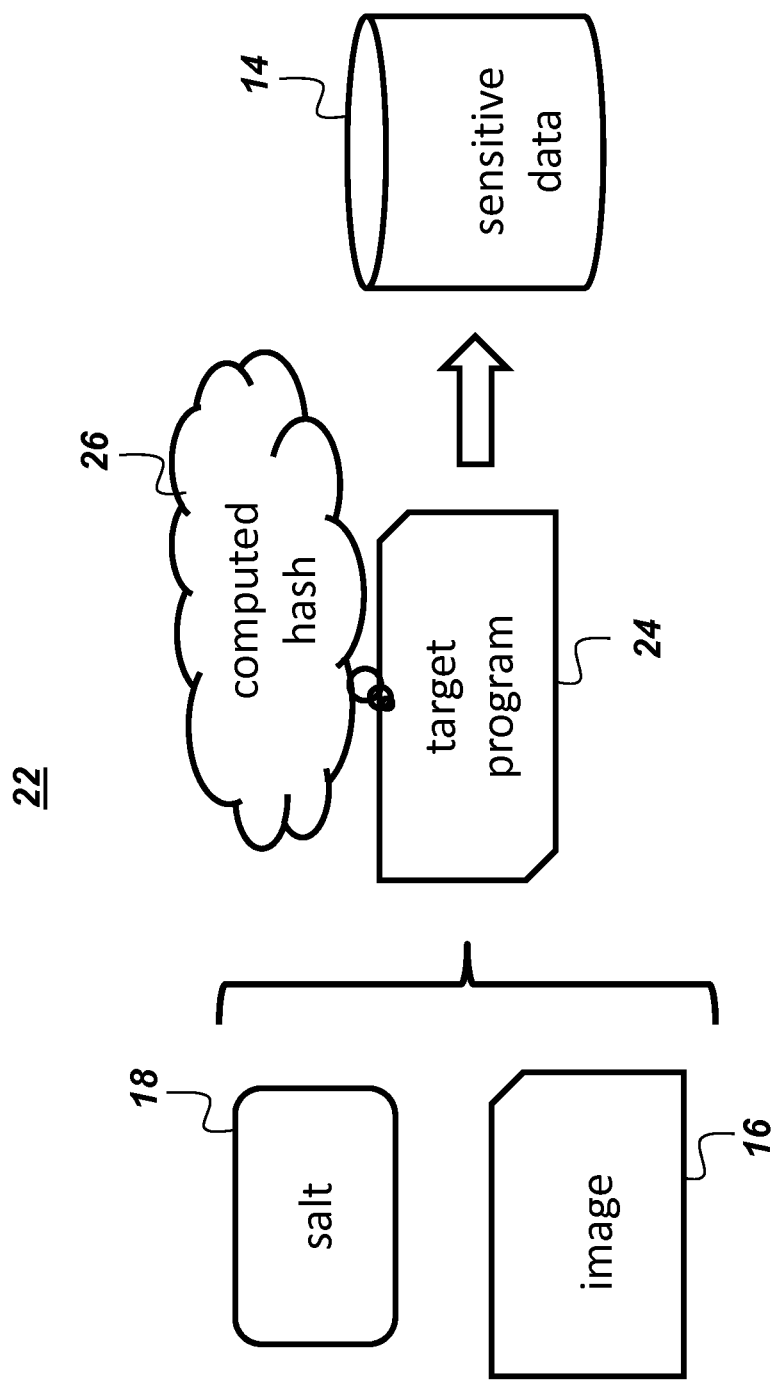
FIG. 2 illustrates a method of recovering sensitive data in accordance with a first embodiment of the disclosure.

Referring to FIG. 2 there is illustrated a method of recovering sensitive data in accordance with a first embodiment of the disclosure that uses the output of the method of FIG. 1. At some point in the future, the target program 24 needs access to the sensitive data 14. The target program 24 reverses the steps described herein above. That is, the target program 24 accepts as input the image 16, computes a hash over the image 26, and combines the stored salt 18 with the image 16 to produce the sensitive data 14.

The advantage of the method and system of FIGS. 1 and 2 is that the sensitive (i.e. secret) data is not initially available for an attacker to peruse. The sensitive data is only available at the point of the program just before it is used, and after the hash function is computed. Therefore if the hash function is used to validate that a program image has not been tampered and the sensitive data is a function address to be called upon a successful validation, then the system adequately conceals this method of detecting tampering in the program. This practical embodiment of the mechanism is described in detail below.

The above-described approach has effectively split information across the build-time and run-time to share a secret.

Figure 3:
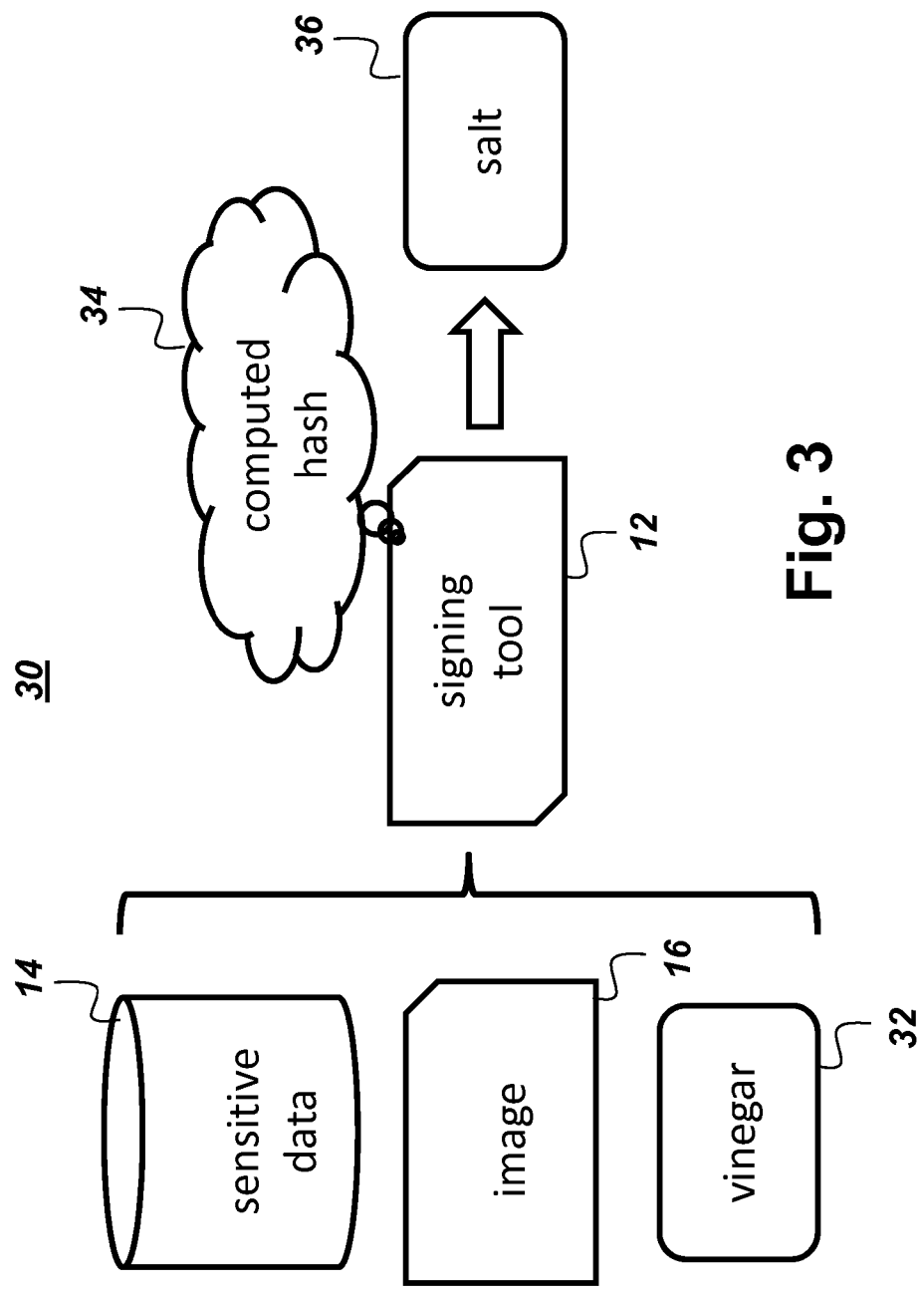
FIG. 3 illustrates a method protecting sensitive data in accordance with a second embodiment of the present disclosure.

The above process can be diversified; that is, it can be made to depend on another variable, a shared secret between the signing tool and the target program. This secret variable is herein after referred to as a "vinegar", and it is combined with the image before the hash is computed, as illustrated in FIG. 3. The process 30 of FIG. 3 adds a vinegar 32 to the inputs to the signing tool 12 during build time.

Figure 4:
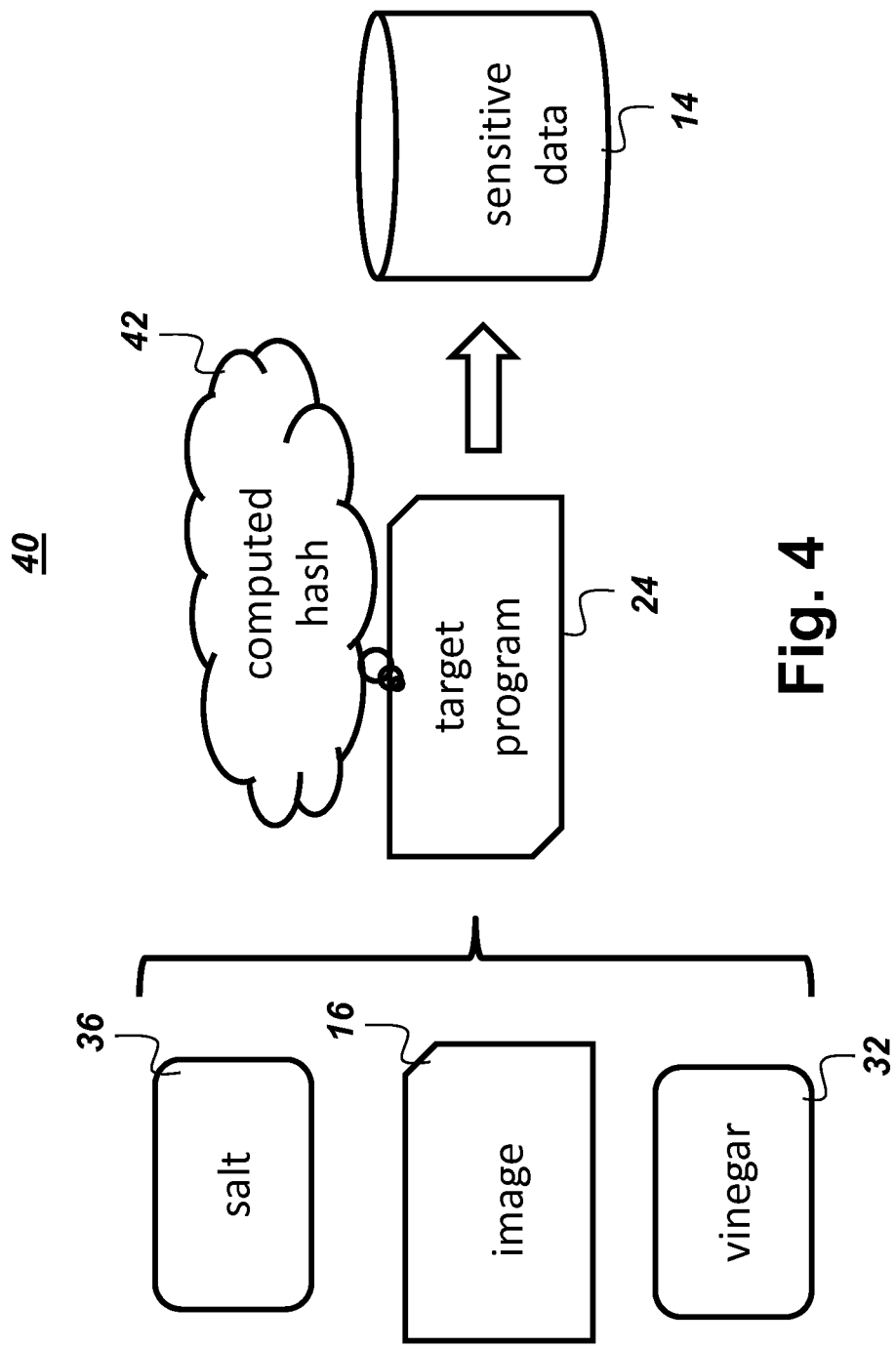
FIG. 4 illustrates a method of recovering sensitive data in accordance with a first embodiment of the present disclosure.

Adding in the vinegar 32 means that there is an additional variable that must be provided by the target program 24 in order to unlock the value of the sensitive data 14, as illustrated in FIG. 4.

Unless the vinegar 32 is supplied correctly, the sensitive data 14 will be incorrect/unusable. Detection of correctness is addressed herein below with regard to FIG. 7.

The advantage of this extra measure is that a secret may be split across the build-time and run-time, just as in the previous case (i.e. salt+hash); however, an additional split across different points of the program may also be achieved. Further examples are provided when describing multiple vinegars with reference to FIGS. 5 and 6.

Figure 5:
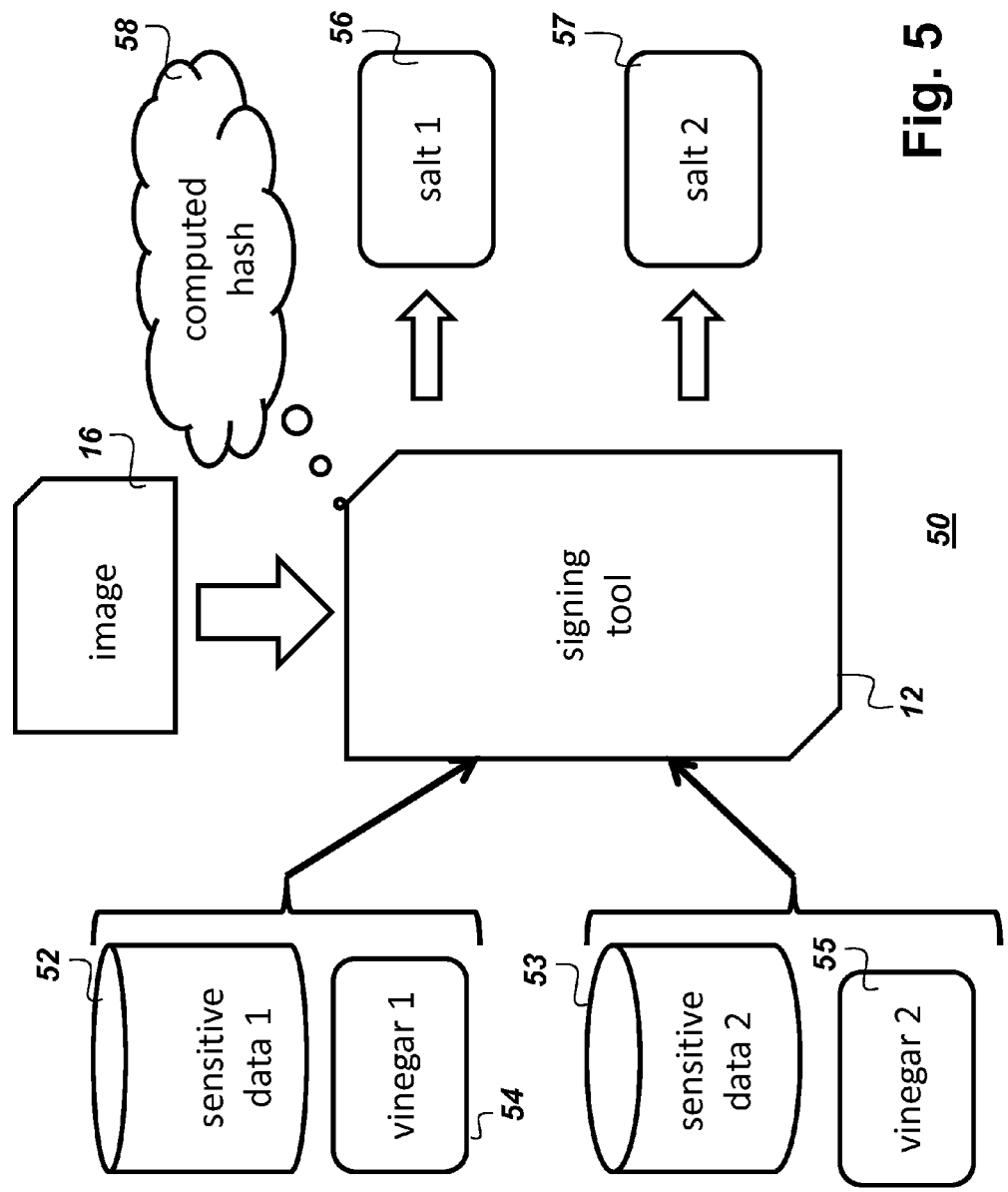
FIG. 5 illustrates a method protecting sensitive data in accordance with a third embodiment of the present disclosure.

Referring to FIG. 5, there is illustrated a example of a build time process 50 that uses multiple vinegars. Sensitive data is split in two, 52 and 53, which is combined with two vinegars 54 and 55, using signing tool 12 and image 16, to produce two salts 56 and 57.

The advantage of multiple vinegars is that multiple pieces of sensitive data can be encoded using the same hash image, while retaining their individual secrecy. That is, computing one piece of sensitive data will not reveal the values of other pieces of sensitive data, even though they are encoded using the same hash. This would have been the case in the simple Salt+Hash model. In the process of FIG. 5, two or more vinegars (54 and 55) are supplied to the signing tool 12. Each vinegar is associated with a piece of sensitive data. Using the same image 16, the signing tool 12 computes two different salts (56 and 57). Each salt is associated with a piece of sensitive data.

Figure 6:
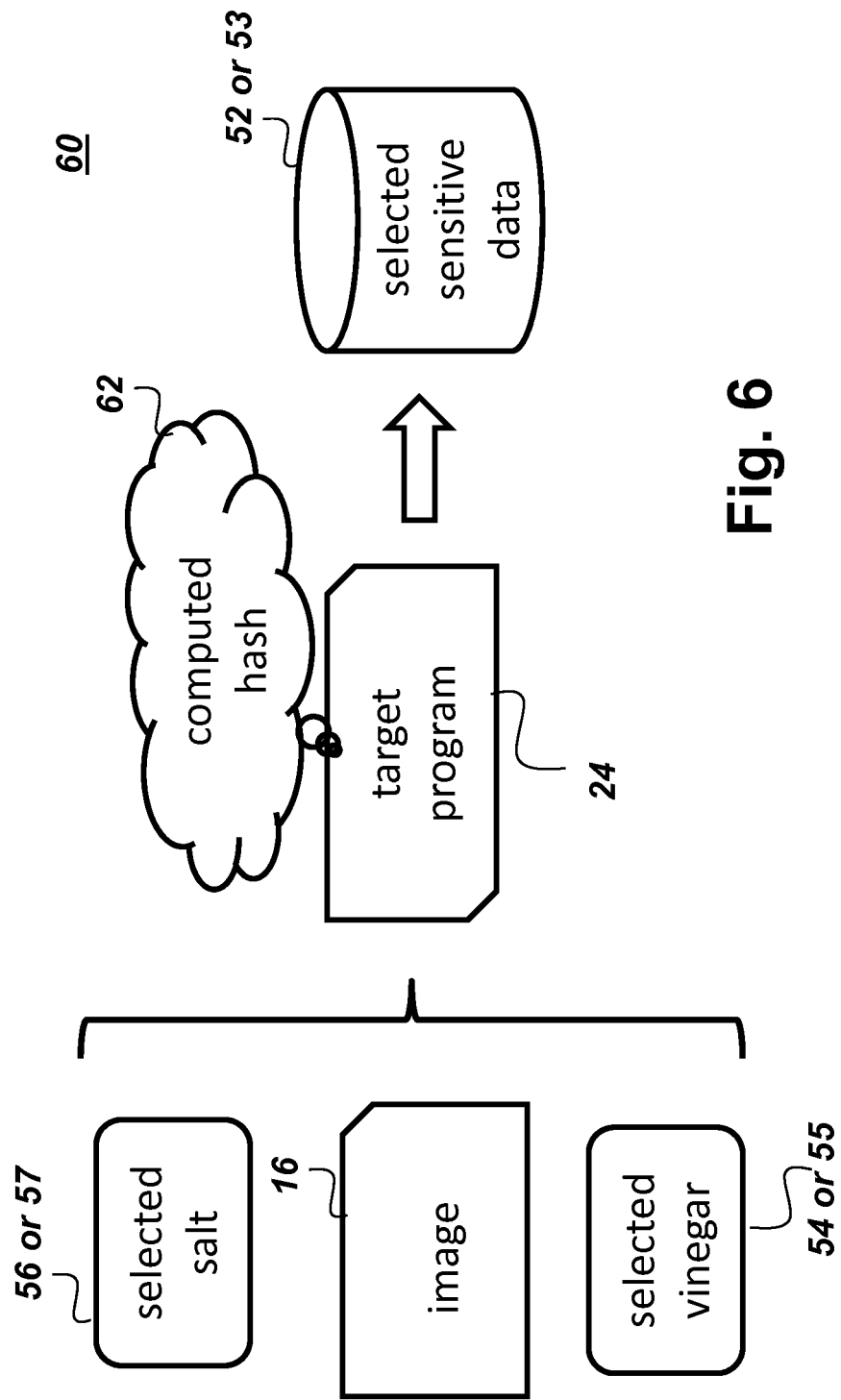
FIG. 6 illustrates a method of recovering sensitive data in accordance with a third embodiment of the present disclosure.

Referring to FIG. 6, there is illustrated an example of a runtime process. At runtime 60, a vinegar 54 or 55 is selected in the code segment of the program, which selects which piece of sensitive data 52 or 53 the program wishes to access. The selected vinegar 54 or 55 is applied to the image 16, and then combined with the appropriate salt 56 or 57 to reveal the selected piece of sensitive data 52 or 53.

The action of selecting a vinegar at run-time effectively allows the programmer to associate an arbitrary value (i.e. the vinegar) with a secure access to the selected sensitive data. Therefore, only at the successful computation of a hash value 62 combined with a salt and run-time selected vinegar, the sensitive data is produced.

Figure 7:
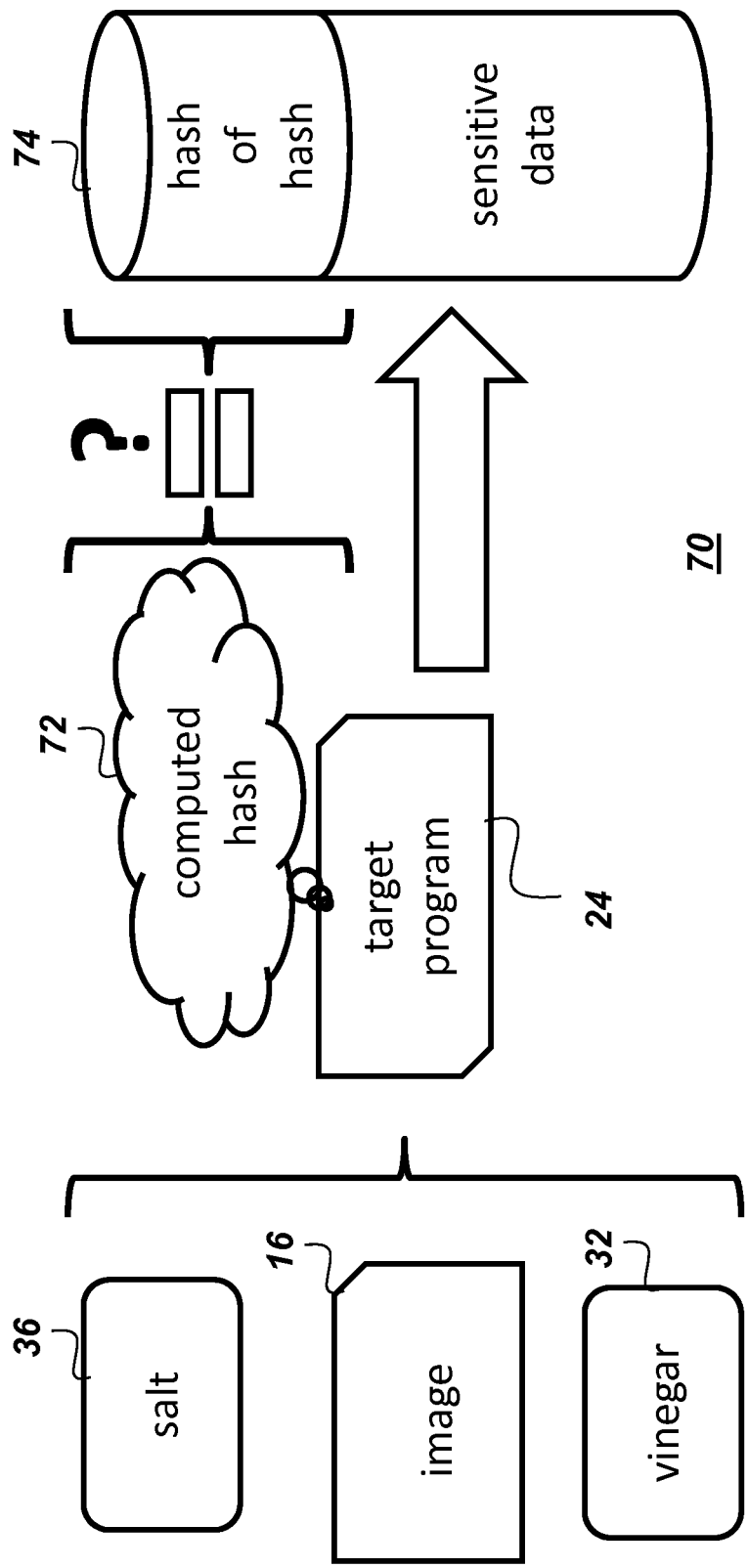
FIG. 7 illustrates a method of protecting sensitive data in accordance with a fourth embodiment of the present disclosure.

Referring to FIG. 7, there is illustrated a process 70 for verifying the sensitive data. In certain cases it is desirable and/or necessary to verify the validity of the resultant sensitive data. Clearly, this cannot be done by a simple comparison against the expected answer, as that would reveal the sensitive data. An elegant solution as an embodiment of the present invention is the use of part of the output as a hash of the hash. Using the example of FIG. 7, the process 70 takes a portion of the computed hash 72 as a hash of the hash 74.

In this method, the hash of the hash 74 is computed and incorporated into the salt such that it is available during runtime. Comparing the hash of the hash with a fixed value, that is the stored hash of the hash, does not reveal any useful information about the sensitive data, except whether or not the computed hash was in fact computed correctly. i.e., not based on corrupted data.

In a multiple vinegar situation, it is possible and desirable to decouple the salts from the sensitive data. In such a case, the salts would be computed as above (in "Multiple Vinegar Model") but would then be randomized in the storage area (they could be sorted numerically, for example). In order to use the sensitive data, the program would compute the hash of hash and sensitive data component, and then verify the hash of hash against the computed hash of the hash. If the vinegar supplied by the program matches one of the vinegars supplied at signing time, and there has not been any tampering of the image, then one of the hash of hash values will match the computed hash of the hash. The sensitive data associated with that computation is correct and can be used by the program.

The amount of sensitive data that can be encoded using the methods described above is limited to the number of bits contained in the hash output because the hash output is combined with a salt in order to produce the sensitive data. The amount of sensitive data that can be encoded decreases with the size of the self-check value, if any.

If the size of the sensitive data is larger than the number of bits provided in this manner, then the size can be increased by providing multiple salts per sensitive data element instead of a single salt per sensitive data element. Each such salt is combined with the computed hash, and yields additional bits of the sensitive data element. (One of the salts can still, when combined with the computed hash, contain the self-check data). Alternatively, multiple vinegars can be used in turn to provide pieces of the sensitive data element.

If the size of the sensitive data is large, an alternative would be to store the key to a set of encrypted data in the manner described above.

In a further scenario, suppose that is not desirable to reveal the secret data even at run-time of the program. In this case, it is desirable to combine techniques in U.S. Pat. No. 6,594,761 and U.S. Pat. No. 6,842,862 to effectively conceal data even while it is in use. The techniques described in these patents show how operations and data use may be transformed to run in a mathematical space which is unapparent to the attacker while running the program.

The above described methods are in two components, the signer as described above is called a signing tool, and the target program as described above is called the verifying library and is meant to be integrated by a customer into a fully operating program.

The signing tool is used to combine a number of vinegars with sensitive data. The vinegars are 32 bit integers, and the sensitive data is the address of the successful callback function. The job is to verify the integrity of the customer-supplied program. In this case, there are multiple images as defined above. Each image is a portion of the customer-supplied program. For example, the customer-supplied program ("app.exe") may be divided into 10 pieces (selected on the command line to signing tool) and the customer may desire three success callback functions (called sf1( ), sf2( ), and sf3( )) associated with three vinegars (0x1234, 0x9876, and the classic 0xdeadbeef). In this case, the customer would supply the following command line options (in addition to others required for signing tool operation):

–f app.exe –l10 –Bsf1, 0x1234 –Bsf2, 0x9876 –Bsf3, 0xdeadbeef

This causes signing tool to create 10 signatures (the "–l10" part), from the app.exe program with the named success callback functions and their associated vinegars.

In reality, signing tool calculates 30 hashes—the program is divided into 10 parts, and there are 3 vinegars (for each part). Each group of three hashes is computed with the associated vinegar, and the result is stored in a "voucher file". This voucher file is then used at runtime by the application.

Figure 8:
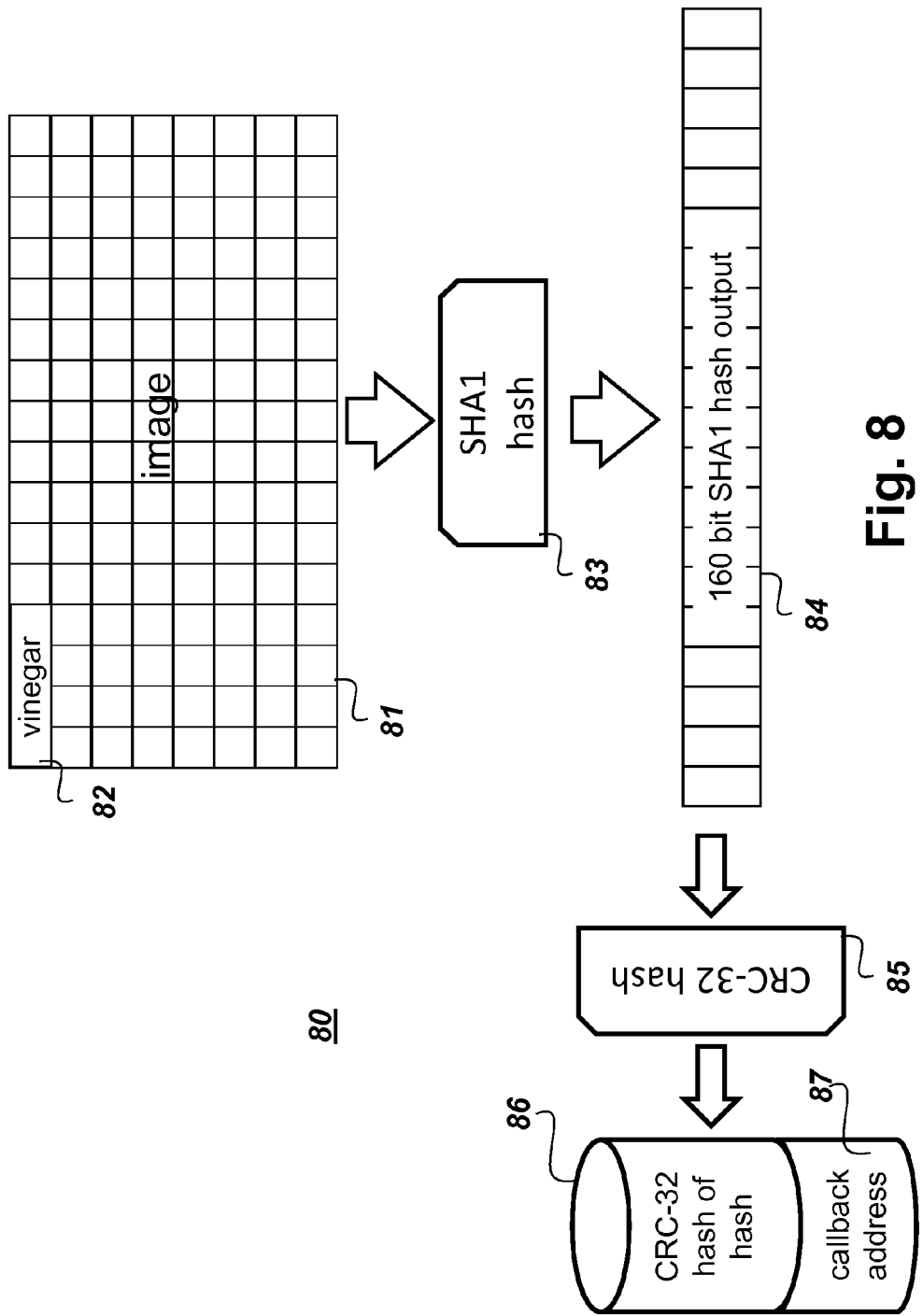
FIG. 8 illustrates further detail of the method of FIG. 7.

Referring to FIG. 8 there is illustrated the first part of the computation. The process 80 takes an image 81 and vinegar 82, applies a first hash function 83 to generate a 160-bit hash 84. Then a second hash function 85 is applied to generate a hash of the hash 86, which is stored with the callback address 87.

The supplied 32-bit vinegar 82 is prepended to the image 81; that is the image is made to be four bytes bigger than the actual size. A SHA1 hash 84 is then calculated over this combined image+vinegar. The 160-bit value 84 of the SHA1 hash is then processed by the CRC-32 hash algorithm 85 and produces a 32-bit checksum 86. The checksum 86 and the callback address 87, as supplied on the command line, forms the sensitive data that is to be protected using this method.

Figure 9:
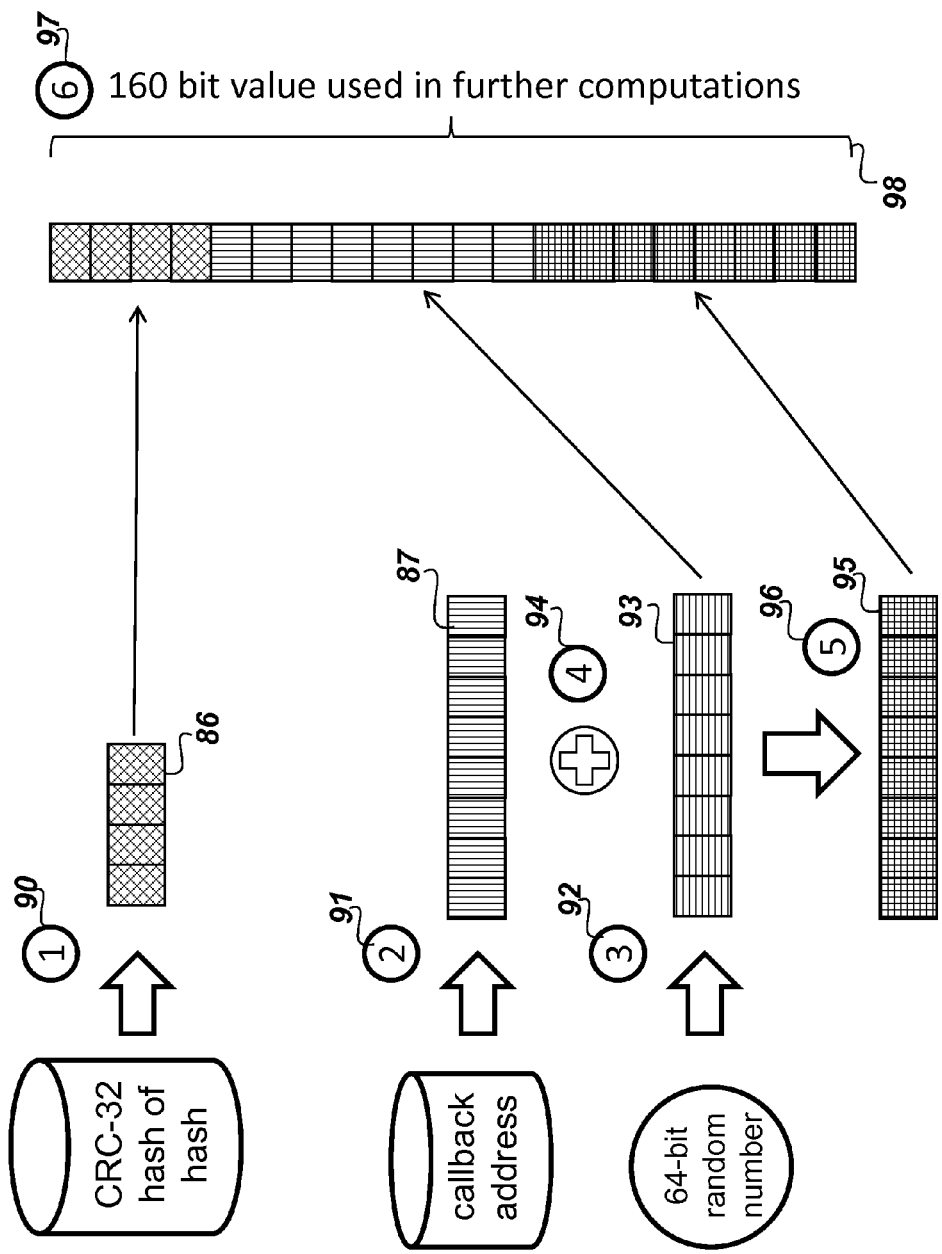
FIG. 9 illustrates further detail of the method of FIG. 7.

The first part of this process is as illustrated in FIG. 9, wherein a 160-bit value is computed. The following steps are taken:

Step 1) (90) The CRC-32 of the SHA1 is stored in 4 bytes (86).

Step 2) (91) The callback address 87 is stored in 8 bytes (in the case of a 32 bit callback address, the top 4 bytes are zero).

Step 3) (92) A random 64-bit value 93 is selected, and stored in 8 bytes.

Step 4) (94) The 8 bytes from the callback address 87 is combined via exclusive-OR with the 8 bytes of the random value 93 to produce an intermediate value 95.

Step 5) (96) The intermediate value 95 as a result of step 4 is stored into 8 bytes.

Step 6) (97) The values from steps 1, 4, and 5 are combined to create a 160-bit (20 byte) value (98), which is used in further computations.

Figure 10:
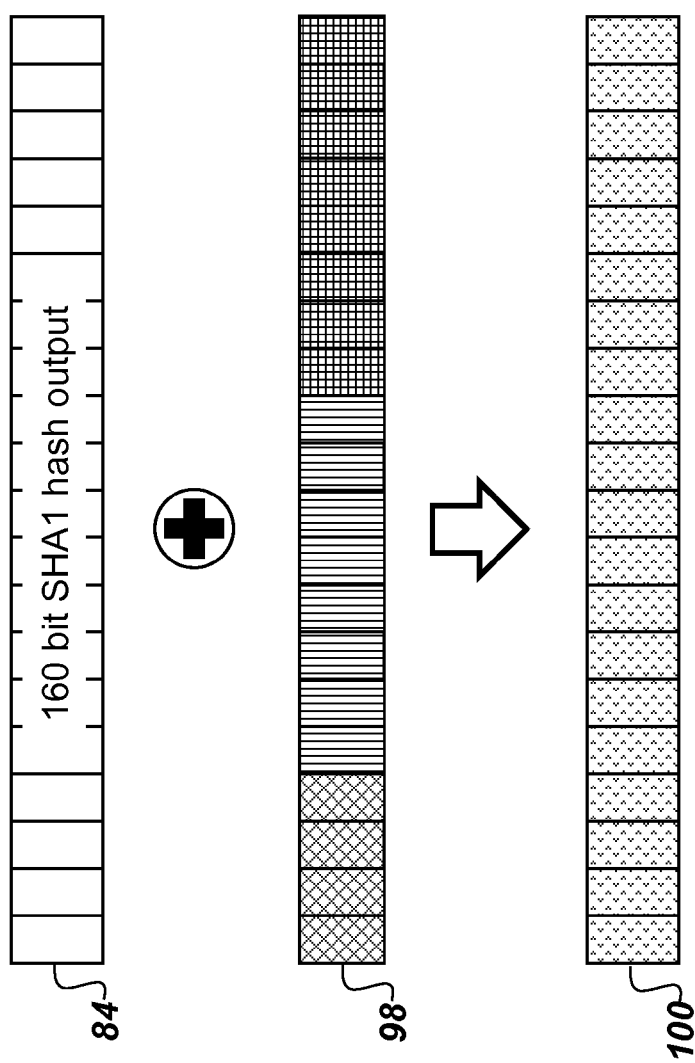
FIG. 10 illustrates further detail of the method of FIG. 7.

As shown in FIG. 10, the final value 98 resulting from step 6 (97) of FIG. 9 is then combined via exclusive-OR with the 160-bit SHA1 value 84 of the vinegar+image, and stored 100 in the voucher file.

At runtime, a similar (reverse) process is used in FIG. 11:

Step 1) The salt value 100 is retrieved from the voucher file.

Step 2) The application-supplied vinegar 82 is prepended to the image 81, and a SHA1 83 is calculated over the result, producing H1, 112.

Step 3) A CRC-32, 113 of the SHA1 hash 112 is computed, producing C1, 114.

Step 4) The salt 100 is combined via exclusive-OR with the SHA1 hash 112, producing three values—C2-115 (the CRC-32 stored in the signing step) and V1-116 and V2-117 (the two 8-byte values stored in the signing step).

Step 5) C1-114 and C2-115 are compared.

Step 6) If they match, then V1-116 and V2-117 are combined via exclusive OR in order to retrieve the address stored 87 from the signing step. At this point the algorithm is finished, as it has successfully retrieved the sensitive data element, namely the address 87.

Step 7) If C1-114 and C2-115 do not match, then the next salt in the voucher file is processed, until a match is found, or all salts have been exhausted.

Step 8) If no salts match, then a failure is declared.

Numerous modifications, variations and adaptations may be made to the particular embodiments described above without departing from the scope of the patent disclosure, which is defined in the claims.

What is claimed is:

1. A method executed by one or more computing devices for protecting sensitive data comprising the steps of:
generating, by at least one of the one or more computing devices, a build-time hash during build-time of a program based at least in part on a program image, wherein the program image corresponds to a portion of the program;
computing, by at least one of the one or more computing devices, a salt during build time of the program based at least in part on a portion of sensitive data, the program image, and the build-time hash, wherein the salt comprises a value, that when combined with a hash value, produces the portion of sensitive data;
storing, by at least one of the one or more computing devices, the salt;
generating, by at least one of the one or more computing devices, a run-time hash during run-time of the program based at least in part on the program image;
retrieving, by at least one of the one or more computing devices, the salt during run-time of the program; and
combining, by at least one of the one or more computing devices, the run-time hash with the salt during run-time of the program to recover the portion of sensitive data.

2. The method of claim 1, wherein the build-time hash is generated by applying a hash function to a combination of the program image and a vinegar to generate the build-time hash.

3. The method of claim 2, further comprising:
generating, by at least one of the one or more computing devices, a second build-time hash by applying the hash function to a combination of the program image and a second vinegar to generate the second build-time hash; and
computing, by at least one of the one or more computing devices, a second salt during build time of the program based at least in part on a second portion of sensitive data, the program image, and the second build-time hash, wherein the second salt comprises a value, that when combined with a hash value, produces the second portion of sensitive data.

4. The method of claim 3, wherein the run-time hash is generated by applying a hash function to a combination of the program image and the vinegar to generate the run-time hash and further comprising:
generating, by at least one of the one or more computing devices, a second run-time hash by applying the hash function to a combination of the program image and the second vinegar to generate a second run-time hash.

5. The method of claim 4, further comprising:
retrieving, by at least one of the one or more computing devices, the second salt during run-time of the program; and
combining, by at least one of the one or more computing devices, the second run-time hash with the second salt during run-time of the program to recover the second portion of sensitive data.

6. The method of claim 5, wherein the first vinegar corresponds to the first portion of sensitive data and wherein the second vinegar corresponds to the second portion of sensitive data.

7. The method of claim 6, further comprising:
receiving, by at least one of the one or more computing devices, a selection of the first vinegar or the second vinegar;
wherein the hash function is applied to a combination of the program image and the first vinegar to generate a the first run-time hash when the first vinegar is selected; and
wherein the hash function is applied to a combination of the program image and the second vinegar to generate the second run-time hash when the second vinegar is selected.

8. The method of claim 7, wherein:
the first run-time hash is combined with the first salt to recover the first portion of sensitive data when the first vinegar is selected; and
the second run-time hash is combined with the second salt to recover the second portion of sensitive data when the second vinegar is selected.

9. The method of claim 1, further comprising:
hashing, by at least one of the one or more computing devices, the build-time hash during build-time to generate a build-time verification hash;
hashing, by at least one of the one or more computing devices, the run-time hash during run-time to generate a run-time verification hash;
comparing, by at least one of the one or more computing devices, the build-time verification hash with the run-time verification hash to determine if they are the same during run-time; and verifying, by at least one of the one or more computing devices, a the portion of sensitive data if they are the same.

10. The method of claim 9, wherein computing the salt during build time of the program based at least in part on the portion of sensitive data, the program image, and the build-time hash comprises:
combining the build-time verification hash with a random number and an intermediate value generated from the random number and the corresponding portion of sensitive data to generate a combined value; and
exclusive or-ing the combined value with the corresponding build-time hash to compute the one or more salts.

11. The method of claim 1, wherein the sensitive data is an instruction address and wherein the instruction address includes at least one of a branching address and a callback function address.

12. A system for protecting sensitive data, the system comprising:
one or more processors; and
one or more memories operatively coupled to at least one of the one or more processors and having instructions stored thereon that, when executed by at least one of the one or more processors, cause at least one of the one or more processors to:
generate a build-time hash during build-time of a program based at least in part on a program image, wherein the program image corresponds to a portion of the program;
compute a salt during build time of the program based at least in part on a portion of sensitive data, the program image, and the build-time hash, wherein the salt comprises a value, that when combined with a hash value, produces the portion of sensitive data;
store the salt;
generate a run-time hash during run-time of the program based at least in part on the program image;
retrieve the salt during run-time of the program; and
combine the run-time hash with the salt during run-time of the program to recover the portion of sensitive data.

13. The system of claim 12, wherein the build-time hash is generated by applying a hash function to a combination of the program image and a vinegar to generate the build-time hash.

14. The system of claim 13, wherein at least one of the one or more memories has further instructions stored thereon that, when executed by at least one of the one or more processors, cause at least one of the one or more processors to:
generate a second build-time hash by applying the hash function to a combination of the program image and a second vinegar to generate the second build-time hash; and
compute a second salt during build time of the program based at least in part on a second portion of sensitive data, the program image, and the second build-time hash, wherein the second salt comprises a value, that when combined with a hash value, produces the second portion of sensitive data.

15. The system of claim 14, wherein the run-time hash is generated by applying a hash function to a combination of the program image and the vinegar to generate the run-time hash and wherein at least one of the one or more memories has further instructions stored thereon that, when executed by at least one of the one or more processors, cause at least one of the one or more processors to:

generate a second run-time hash by applying the hash function to a combination of the program image and the second vinegar to generate a second run-time hash.

16. The system of claim 15, wherein at least one of the one or more memories has further instructions stored thereon that, when executed by at least one of the one or more processors, cause at least one of the one or more processors to:
retrieve the second salt during run-time of the program; and
combine the second run-time hash with the second salt during run-time of the program to recover the second portion of sensitive data.

17. The system of claim 16, wherein the first vinegar corresponds to the first portion of sensitive data and wherein the second vinegar corresponds to the second portion of sensitive data.

18. The system of claim 17, wherein at least one of the one or more memories has further instructions stored thereon that, when executed by at least one of the one or more processors, cause at least one of the one or more processors to:
receive a selection of the first vinegar or the second vinegar;
wherein the hash function is applied to a combination of the program image and the first vinegar to generate a the first run-time hash when the first vinegar is selected; and
wherein the hash function is applied to a combination of the program image and the second vinegar to generate the second run-time hash when the second vinegar is selected.

19. The system of claim 18, wherein:
the first run-time hash is combined with the first salt to recover the first portion of sensitive data when the first vinegar is selected; and
the second run-time hash is combined with the second salt to recover the second portion of sensitive data when the second vinegar is selected.

20. The system of claim 12, wherein at least one of the one or more memories has further instructions stored thereon that, when executed by at least one of the one or more processors, cause at least one of the one or more processors to:
hash the build-time hash during build-time to generate a build-time verification hash;
hash the run-time hash during run-time to generate a run-time verification hash;
compare the build-time verification hash with the run-time verification hash to determine if they are the same during run-time; and
verifying a the portion of sensitive data if they are the same.

21. The system of claim 20, wherein the instructions that, when executed by at least one of the one or more processors, cause at least one of the one or more processors to compute the salt during build time of the program based at least in part on the portion of sensitive data, the program image, and the build-time hash further cause at least one of the one or more processors to:
combine the build-time verification hash with a random number and an intermediate value generated from the random number and the corresponding portion of sensitive data to generate a combined value; and
exclusive or the combined value with the corresponding build-time hash to compute the one or more salts.

22. The system of claim 12, wherein the sensitive data is an instruction address and wherein the instruction address includes at least one of a branching address and a callback function address.

23. At least one non-transitory computer-readable medium storing computer-readable instructions that, when executed by one or more computing devices, cause at least one of the one or more computing devices to:
generate a build-time hash during build-time of a program based at least in part on a program image, wherein the program image corresponds to a portion of the program;
compute a salt during build time of the program based at least in part on a portion of sensitive data, the program image, and the build-time hash, wherein the salt comprises a value, that when combined with a hash value, produces the portion of sensitive data;
store the salt;
generate a run-time hash during run-time of the program based at least in part on the program image;
retrieve the salt during run-time of the program; and
combine the run-time hash with the salt during run-time of the program to recover the portion of sensitive data.

24. The at least one non-transitory computer-readable medium of claim 23, wherein the build-time hash is generated by applying a hash function to a combination of the program image and a vinegar to generate the build-time hash.

25. The at least one non-transitory computer-readable medium of claim 24, further storing computer-readable instructions that, when executed by at least one of the one or more computing devices, cause at least one of the one or more computing devices to:
generate a second build-time hash by applying the hash function to a combination of the program image and a second vinegar to generate the second build-time hash; and
compute a second salt during build time of the program based at least in part on a second portion of sensitive data, the program image, and the second build-time hash, wherein the second salt comprises a value, that when combined with a hash value, produces the second portion of sensitive data.

26. The at least one non-transitory computer-readable medium of claim 25, wherein the run-time hash is generated by applying a hash function to a combination of the program image and the vinegar to generate the run-time hash and further storing computer-readable instructions that, when executed by at least one of the one or more computing devices, cause at least one of the one or more computing devices to:
generate a second run-time hash by applying the hash function to a combination of the program image and the second vinegar to generate a second run-time hash.

27. The at least one non-transitory computer-readable medium of claim 26, further storing computer-readable instructions that, when executed by at least one of the one or more computing devices, cause at least one of the one or more computing devices to:
retrieve the second salt during run-time of the program; and
combine the second run-time hash with the second salt during run-time of the program to recover the second portion of sensitive data.

28. The at least one non-transitory computer-readable medium of claim 27, wherein the first vinegar corresponds to the first portion of sensitive data and wherein the second vinegar corresponds to the second portion of sensitive data.

29. The at least one non-transitory computer-readable medium of claim 28, further storing computer-readable instructions that, when executed by at least one of the one or more computing devices, cause at least one of the one or more computing devices to:
receive a selection of the first vinegar or the second vinegar;
wherein the hash function is applied to a combination of the program image and the first vinegar to generate a the first run-time hash when the first vinegar is selected; and
wherein the hash function is applied to a combination of the program image and the second vinegar to generate the second run-time hash when the second vinegar is selected.

30. The at least one non-transitory computer-readable medium of claim 29,
the first run-time hash is combined with the first salt to recover the first portion of sensitive data when the first vinegar is selected; and
the second run-time hash is combined with the second salt to recover the second portion of sensitive data when the second vinegar is selected.

31. The at least one non-transitory computer-readable medium of claim 23, further storing computer-readable instructions that, when executed by at least one of the one or more computing devices, cause at least one of the one or more computing devices to:
hash the build-time hash during build-time to generate a build-time verification hash;
hash the run-time hash during run-time to generate a run-time verification hash;
compare the build-time verification hash with the run-time verification hash to determine if they are the same during run-time; and
verifying a the portion of sensitive data if they are the same.

32. The at least one non-transitory computer-readable medium of claim 31, wherein the instructions that, when executed by at least one of the one or more computing devices, cause at least one of the one or more computing devices to compute the salt during build time of the program based at least in part on the portion of sensitive data, the program image, and the build-time hash further cause at least one of the one or more computing devices to:
combine the build-time verification hash with a random number and an intermediate value generated from the random number and the corresponding portion of sensitive data to generate a combined value; and
exclusive or the combined value with the corresponding build-time hash to compute the one or more salts.

33. The at least one non-transitory computer-readable medium of claim 23, wherein the sensitive data is an instruction address and wherein the instruction address includes at least one of a branching address and a callback function address.

* * * * *